2,790,762
PURIFICATION OF WASTE WATER BASED ON THE USE OF VIBRATIONS

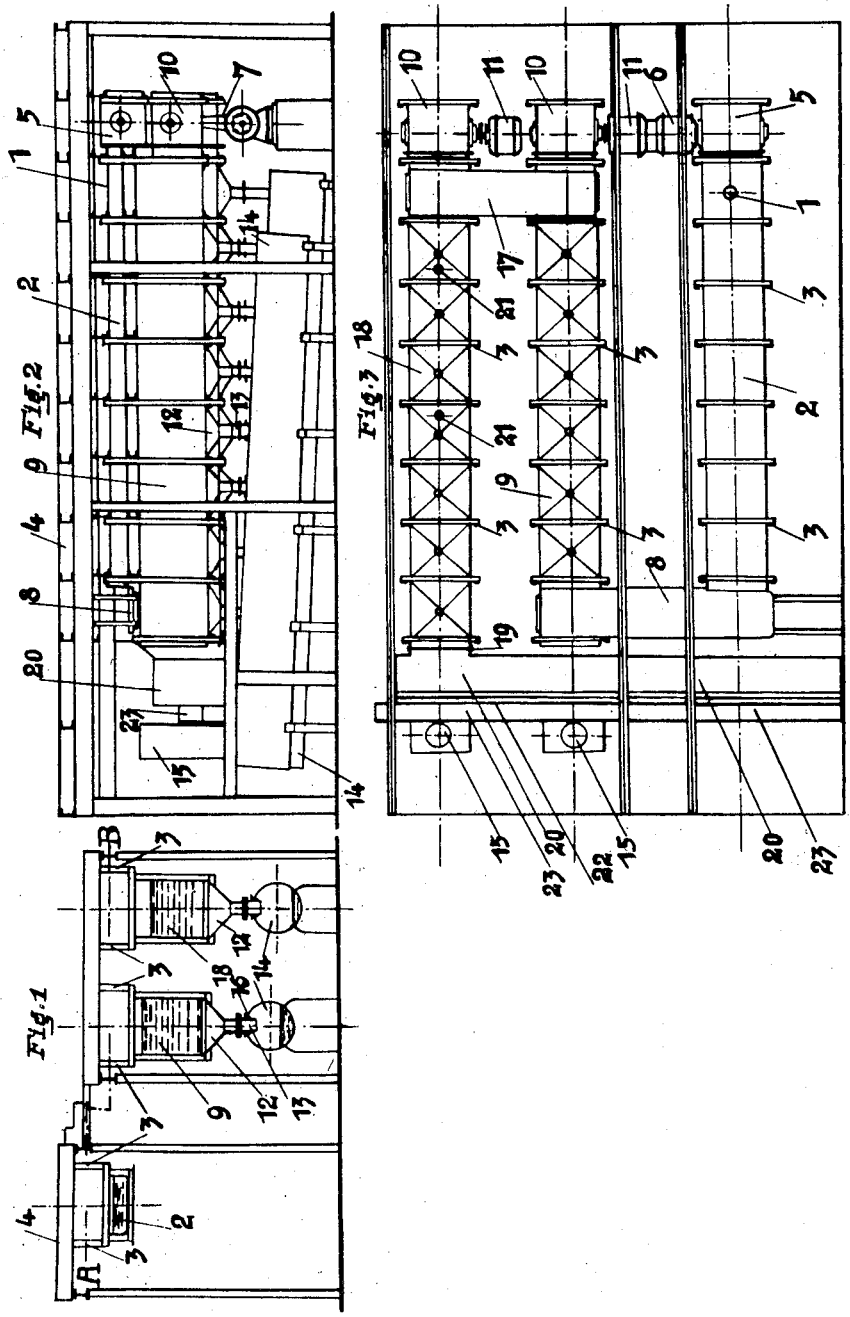

Hans Heymann, Ulm (Danube), Germany

Application January 31, 1952, Serial No. 269,169

1 Claim. (Cl. 210—19)

This invention relates to the purification of waste water based on the use of vibrations.

In the process of purification of waste water, there has been a change from the use of the well-known settling basins to the use of vibrating containers through which the waste water is conducted. The vibrations of the container are regulated in such way with respect to amplitude, frequency and direction, that friction is reduced between the heavy suspended and the suspended substances, on the one hand, and the liquid in which they are contained, on the other hand, without any pronounced disturbance of the laminar flow of the liquid column. Apparatus of the vibrating container type regulated in the proper manner can greatly accelerate the precipitation of suspended particles.

In order to still further accelerate the purifying action of the liquid column using apparatus of the vibrating type, it is known to add special feedings to the waste water, these feedings serving to coagulate substances suspended in the water. When such feedings are added to the waste water in a vibrating purification apparatus, it is customary to use several containers, two, for example, coupled one after the other, which respectively serve as a first purifier and a second purifier. In such case, the feeding material is added at the inlet of the second container. For this purpose, a mixing duct is connected to the inlet of the second container, the mixing of the feeding material with the pre-purified waste water taking place within the mixing duct. The mixing duct then conducts the water, together with the feedings, to the second purifier. The structure and vibrating movement of the second purifier corresponds to that of the first purifier. The effect of adding the feeding material in conjunction with a vibrating system is that only a fraction of the amount of feeding formerly needed with settling basins is required, due to the intensive mixing provided in the mixing duct and also due to the fact that the vibration accelerates the coagulation.

In the settling of waste water, by means of vibrations alone and without the addition of special feeding, it has been observed that the vibrations not only increase the settling speed but also accomplish a coagulation of the suspended substances, so that even particularly fine sludge particles are coagulated which, in former non-vibratory processes, required a long time for settling. This can be shown in a simple way by taking samples of the purified water from the outlet of an apparatus working on a vibrating basis as well as from a normally working settling basin and have each sample stand for a certain length of time without being moved. By the end of the predetermined time, a deposit of sludge has settled at the bottom of each sample glass. The amount of sludge in each respective sample glass can be taken as a standard for indication of the grade of purity of the purifying apparatus from which it was taken. It will be seen that the sample taken from the settling basin contains a much larger quantity of this settled sludge than the sample taken from the apparatus using vibrations.

In accordance with these principles, the conclusion is reached that in the coagulation process, just as in the case of the acceleration of the settling speed, the coagulating effect is dependent upon the vibration and its regulation—that is, upon the choice of amplitude, frequency, curve of the vibration, direction, etc. This principle is the same in the coagulating process with or without feeding. When the physical basis required in the coagulation process differs from that required in the settling process, then an optimal solution of the problem can only be reached, in accordance with this invention, when both processes are performed one after the other in two different containers. It is understood, of course, that the coagulation process should proceed the settling process.

Because the coagulation process is applicable to all heavy suspended particles as well as to fine suspended particles found in waste water, it is not necessary to emphasize that a first purification has to take place before the use of any feeding. Considering the fact that the coagulation process becomes much easier as more suspended particles are colliding in a small space, it must be admitted that the hitherto used first purification was more dangerous than useful. Therefore, this invention requires no first purification in case certain feedings have been used, with the exception of the settling of sand and other particles which float on the surface.

Furthermore, this invention follows the principle that in regulating the vibrations, the specific gravity of the heavy suspended and suspended substances has to be considered. Heavy substances require a stronger vibration than light substances, both in the coagulation process and during the settling which follows the coagulating process. Therefore, this invention provides several stages in the vibrating section. Under certain conditions, two stages would be sufficient. It is advisable, however, to provide at least three vibration stages, the last being entirely intended for the coagulation process. With the beginning of the second stage, the coagulation is continued at the same time that the settling process is starting, until finally, in the last stage, the finest sludges which cannot be dealt with in a normal settling basin, are coagulated and settled.

So far as the fine sludges are concerned, this invention takes advantage of another phenomenon that can be demonstrated most convincingly on a sample of the purified waste water. Using a sample, still containing a certain amount of sludge invisible to the human eye, these impurities will appear as tiny little particles at the end of a certain time, settling with a scarcely measurable speed of settling. If a burning match is held close to the glass containing such a sample, a weak current is created that causes a condensation of these scarcely visible particles. This condensation of the scarcely visible particles is extended more and more until after a certain time precipitations looking like snowflakes will start, having increased their speed of settling many times. The observer gets the impression that a chain reaction is starting. Repeating this experiment on different portions of the glass, the impurities contained in the glass are settled in a short time. The same result can be obtained by subjecting the glass containing the sample liquid to weak vibrations.

The experiment just described demonstrates that in the settling process of the smallest suspended particles, a shock-like agitation will cause the destruction of a balanced condition of the suspension in such manner as to precipitate the very fine impurities. The principle illustrated by the experiment just described is used in accordance with this invention in such a way that, in the last stage of the process, one or more small agitators are provided to disrupt the laminar flow of the liquid column. These agitators radiate in a known manner periodical and aperiodical vibrations and can be switched in and out of operation in a predetermined rhythm. As a further means of creating an unbalanced condition, the channel wall can also be heated artificially, the heating being applied intermittently under certain circumstances.

The features of this invention which I believe to be novel are set forth with particularity in the appended claims. My invention itself, however, both as to its organization and use, together with further objects and advantages thereof, may best be understood by reference to the following description taken in connection with the accompanying drawing in which Fig. 1 shows a cross section through an embodiment of an apparatus in accordance with my invention;

Fig. 2 is a side elevation of the apparatus of Fig. 1; and

Fig. 3 shows a view in horizontal section along line A—B of Fig. 1.

In the embodiment shown in the drawing, it is assumed that the waste water is introduced into the apparatus at 1 by pumping. In the event that it is desired to add a feeding material to the waste water, it may be added in the desired proportions at the inlet 1. The pumping means may be a centrifugal pump which serves at the same time as a first mixer. From inlet 1, the waste water is conducted to the first section 2 which serves as a coagulator. First section 2 is in the form of an elongated duct member. The only function of section 2 is to start the coagulation process by means of strong vibrations and, in the event that a feeding material has been added to the waste water, to serve also as a second mixer.

The coagulator section 2 is suspended from beams 4 of the apparatus by tensioned springs 3 and is put into vibration through the use of an agitator apparatus 5. It is assumed in the embodiment of the invention shown that the coagulator section 2 is vibrated on the basis of a counter-running unbalance activated by an electric motor 6 having a belt 7 as a transmission means. The frequency and amplitude of the vibrations provided by the electric motor 6 can be regulated in a known manner in accordance with the nature of the waste water being treated.

At the left-hand end of the coagulator section 2, with respect to the view shown in the drawing, a stationary conduit 8 is provided to conduct the waste water from the coagulator section to the first purifier 9. The first purifying section 9 is subjected to vibrations just as in the case of the coagulating section 2, but operating with different values of frequency vibration and amplitude. The vibration agitation for the first purifier section 9 is effected through an agitation apparatus 10 which is operated by its own separate electric motor 11. The first purifier 9 is substantially deeper than the coagulation section 2 and is also provided at its bottom with funnel-like recesses 12 which collect the sludge settling at the bottom of the purifier section 9. The sludge coming through the funnel-like collectors 12 is conducted through funnel outlets 13 to a downwardly inclined sludge collecting conduit or container 14 positioned below the funnel outlets 13. The funnel outlets 13 are connected to the sludge collecting container 14 in a sealed manner by means of elastic connections or couplings 16. The container 14 is connected at its rear end with a funnel 15 to let the liquid ascend and will be drained from time to time at its free or lower end through pumping.

The waste water which has passed through the first purifier section 9 is then conducted through the stationary conduit 17 to the second purifier section 18. The mouthpieces of the conduits 8 and 17 are so arranged that direction or flow of the liquid in the first purifier section 9 is opposite to the direction of flow in the second purifier section 18. This arrangement will avoid a dangerous acceleration of the speed of flow in both purifiers.

The structure of the second purifier section 18 corresponds closely to that of the first purifier section 9 in that a series of funnel-like sludge collection members 12 are provided beneath the second purifier section 18, each funnel-like collection member 12 being connected by a funnel outlet member 13 to a sludge collecting conduit 14 inclined at an angle. The outlet of the second purifier 18 is connected to a stationary mouth basin conduit 20 by means of an elastic coupling or connection 19.

The second purifier 18 is regulated to provide the smallest vibrations. To provide these vibrations, two small immersion type agitators 21 are installed in two places along the path of flow of the liquid through the second purifier 18. The agitation or vibration set up by the immersion agitators 21 serves to eliminate the last and finest particles floating through the second purifier 18. The agitators 21 are operated in a known manner and can be switched in and out of operation in a predetermined rhythm.

The mouthpiece of the funnel 22 of the stationary mouth basin 20 is constructed sufficiently wide that the speed of flow through stationary mouth basin 20 will correspond with the speed of flow in the second purifier 18. Settling of the purified waste water will be effected through the stationary conduit 23.

While there has been shown and described a particular embodiment of my invention, it will be obvious to those skilled in the art that various changes and modifications can be made therein without departing from the invention, and therefore, it is aimed in the appended claims to cover all such changes and modifications as fall within the true spirit and scope of the invention.

I claim:

The method of purifying waste liquid which comprises the steps of first passing said waste liquid through a coagulating container having a continuous bottom surface, subjecting said liquid to vibrations of a predetermined frequency and amplitude while in said container, then passing said liquid through at least one settling container provided with sludge outlet means, and subjecting said liquid to vibrations of a predetermined frequency and amplitude while in said settling container, the frequency and amplitude of the vibrations imparted to said liquid in said settling container being less than the frequency and amplitude of vibrations imparted to said liquid in said coagulating container.

References Cited in the file of this patent

UNITED STATES PATENTS

| | | |
|---|---|---|
| 1,662,180 | Ball | Mar. 13, 1928 |
| 1,983,968 | Clark | Dec. 11, 1934 |
| 2,070,201 | Geary | Feb. 9, 1937 |
| 2,073,353 | Schaub | Mar. 9, 1937 |
| 2,089,548 | Frantz et al. | Aug. 10, 1937 |
| 2,316,783 | Geary | Apr. 20, 1943 |
| 2,353,602 | Trotter | July 11, 1944 |
| 2,498,292 | Naugle | Feb. 21, 1950 |
| 2,499,816 | Carter | Mar. 7, 1950 |